US012649254B2

(12) United States Patent
Libert et al.

(10) Patent No.: US 12,649,254 B2
(45) Date of Patent: Jun. 9, 2026

(54) CHAINSAWS AND BAR STUDS THEREFOR

(71) Applicant: Milwaukee Electric Tool Corporation, Brookfield, WI (US)

(72) Inventors: Scott D. Libert, Waukesha, WI (US); Patrick R. Schmidt, Sussex, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 31 days.

(21) Appl. No.: 18/439,193

(22) Filed: Feb. 12, 2024

(65) Prior Publication Data

US 2024/0269880 A1 Aug. 15, 2024

Related U.S. Application Data

(60) Provisional application No. 63/454,373, filed on Mar. 24, 2023, provisional application No. 63/445,186, filed on Feb. 13, 2023.

(51) Int. Cl.
*B27B 17/02* (2006.01)

(52) U.S. Cl.
CPC .................................... *B27B 17/02* (2013.01)

(58) Field of Classification Search
None
See application file for complete search history.

(56) References Cited

U.S. PATENT DOCUMENTS

| | | | | |
|---|---|---|---|---|
| 3,870,125 A * | 3/1975 | Gorski | B27B 17/02 123/196 CP |
| 5,353,506 A | 10/1994 | Muller et al. | |
| 8,615,890 B2 | 12/2013 | Wolf et al. | |
| 8,740,529 B2 | 6/2014 | Martinsson et al. | |
| 11,338,466 B2 * | 5/2022 | Falk | B27B 17/02 |
| 2015/0068048 A1 * | 3/2015 | Yoneyama | B27B 17/02 411/147 |
| 2021/0402642 A1 * | 12/2021 | Posner | B27B 17/0033 |
| 2024/0269880 A1 * | 8/2024 | Libert | B27B 17/02 |

* cited by examiner

*Primary Examiner* — Hwei-Siu C Payer
(74) *Attorney, Agent, or Firm* — Dority & Manning, P.A.

(57) ABSTRACT

A chainsaw and fastener assembly therefor are provided. The chainsaw includes a guide bar extending from a housing and the guide bar positioned between an interior wall of the housing and a casing interior to the housing. The fastener assembly includes an outer fastener, a bar stud, and an inner fastener. The bar stud includes a plate having a first side, a second side, and an anti-rotation interface. The bar stud includes a first threaded member extending from the first side of the plate and a second threaded member extending from the second side of the plate. The plate is positioned between the guide bar and the casing. The outer fastener is threadable onto the first threaded member extending through the housing. The second threaded member is extendable through the casing and threadable onto the inner fastener.

20 Claims, 4 Drawing Sheets

CHAINSAWS AND BAR STUDS THEREFOR

PRIORITY STATEMENT

The present application claims the benefit of priority to U.S. provisional application No. 63/454,373, filed Mar. 24, 2023, and to U.S. provisional application No. 63/445,186, filed Feb. 13, 2023, the disclosures of which are incorporated by reference herein in their entireties.

FIELD

The present disclosure relates generally to chainsaws, and more particularly to improved bar stud designs for chainsaws.

BACKGROUND

Power tools are generally utilized in lieu of hand tools. Power tools can perform the same, or similar, tasks as hand tools at higher efficiency, allowing the operator controlling the power tool to use less effort in achieving a task. For example, chainsaws can cut through wood faster than traditional handsaws. Circular saws can cut through metal faster than traditional hacksaws. Vacuums can remove debris faster than traditional brooms. And so on.

Most chainsaw designs today use a bolt or stud threaded into and attached to the gearcase and that tightened to the chainsaw bar with a user-facing nut. However, an issue with such designs is that the user may be able to accidentally damage the gearcase by overtightening of the bolt/stud.

Accordingly, improved bar studs and chainsaws which meet the above requirements and address the above issues are desired and would be advantageous.

BRIEF DESCRIPTION

Aspects and advantages of the invention in accordance with the present disclosure will be set forth in part in the following description, or may be obvious from the description, or may be learned through practice of the technology.

An aspect of the present disclosure is directed to a chainsaw having a fastener assembly and a guide bar extending from a housing, in which the guide bar is positioned between an interior wall of the housing and a casing interior to the housing. A fastener assembly includes an outer fastener, a bar stud, and an inner fastener. The bar stud includes a plate including a first side, a second side, and an anti-rotation interface. The bar stud includes a first threaded member extending from the first side of the plate. The bar stud includes a second threaded member extending from the second side of the plate. The plate is positioned between the guide bar and the casing. The outer fastener is threadable onto the first threaded member extending through the housing. The second threaded member is extendable through the casing and threadable onto the inner fastener.

Another aspect of the present disclosure is directed to a fastener assembly for a chainsaw having a guide bar extending from a housing. The guide bar is positioned between an interior wall of the housing and a casing interior to the housing. The fastener assembly includes an outer fastener, an inner fastener, and a bar stud. The bar stud includes a plate having a first side, a second side, and an anti-rotation interface. The bar stud includes a first threaded member extending from the first side of the plate, and a second threaded member extending from the second side of the plate. The plate is positioned between the guide bar and the casing. The outer fastener is threadable onto the first threaded member extending through the housing. The second threaded member is extendable through the casing and threadable onto the inner fastener.

Yet another aspect of the present disclosure is directed to a method for attaching a guide bar to a housing and a casing at a chainsaw. The method includes positioning a plate of a fastener assembly between the guide bar and the casing; extending a first threaded member from the plate through a housing, wherein a first threaded end of the first threaded member extends to an exterior area outside of the housing; extending a second threaded member from the plate through the casing, wherein a second threaded end of the second threaded member extends to an interior area inside of the housing; fastening the second threaded member to an inner fastener at the interior area; and fastening the first threaded member to an outer fastener at the exterior area.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figure 1:
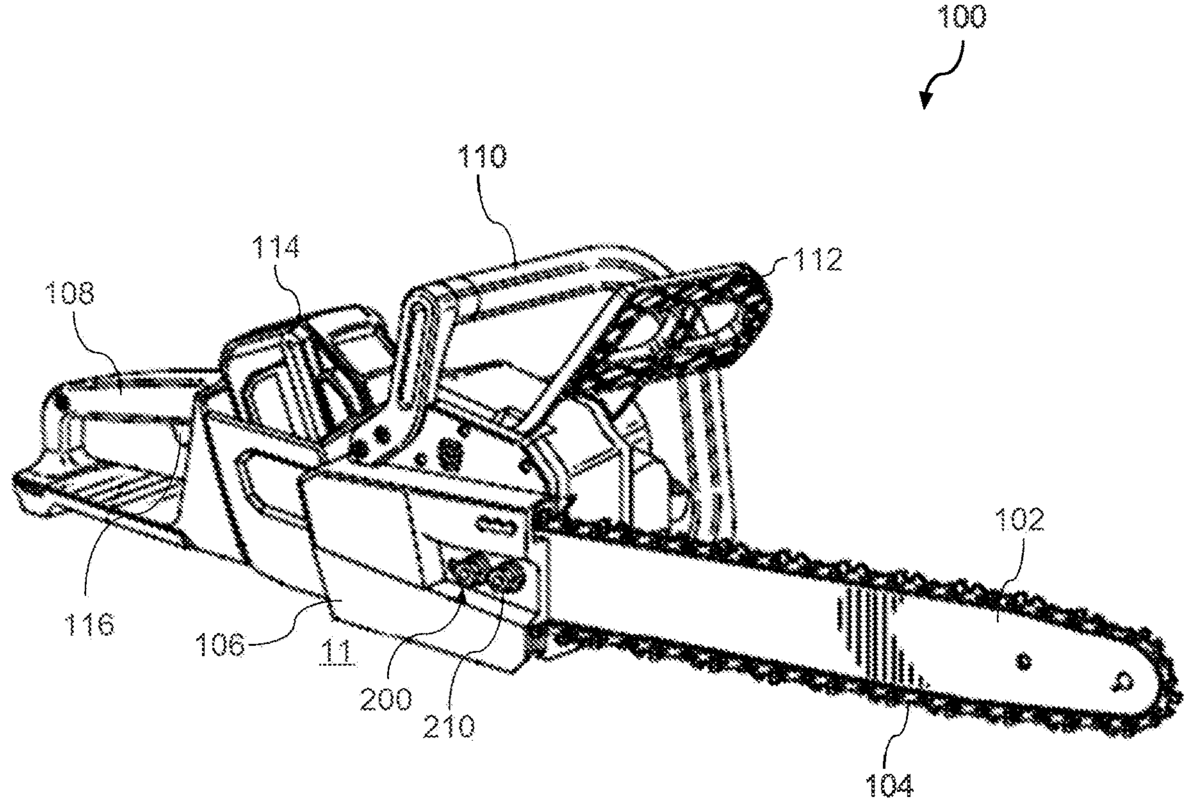
FIG. 1 provides a perspective view of an embodiment of a chainsaw including a fastener assembly in accordance with aspects of the present disclosure.

Repeat use of reference characters in the present specification and drawings is intended to represent the same or analogous features or elements of the present invention.

DETAILED DESCRIPTION

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Referring now to the drawings, FIG. 1 illustrates a power tool in accordance with an exemplary embodiment of the present disclosure. More particularly, FIG. 1 illustrates a chainsaw 100 in accordance with an embodiment of the present disclosure. The chainsaw 100 generally includes a guide bar 102 with a chain 104 movably coupled to an outer track of the guide bar 102. The chain 104 includes teeth which, when moved along the guide bar 102, cause the chain 104 to cut into material, such as logs and branches. The chainsaw 100 can further include a housing 106. The guide bar 102 can extend from the housing 106. An end portion of the guide bar 102 extends into the housing 106. A fastener assembly 200 affixes the guide bar 102 to the housing 106. The chainsaw 100 can include a handle 108. In certain instances, the chainsaw 100 can further include a secondary handle 110. A brake 112 can be positioned along the chainsaw 100 at a location, for example, adjacent to the second handle 110. The brake 112 can provide safety braking which prevents the chainsaw 100 from kicking back onto the operator with the chain 104 moving. Upon occurrence of kickback, the brake 112 can be activated by hitting the operator's arm, thereby causing the chain 104 to abruptly slow down.

The chainsaw 100 can further include a motive device (not illustrated), such as a gas powered engine or an electric motor, which drives a chain sprocket (not illustrated). The chain sprocket can be engaged with the chain 104 such that rotation of the chain sprocket causes the chain 104 to move relative to the guide bar 102. The motive device can be powered, for example, by a rechargeable energy source such as a battery 114, a fuel source such as gasoline, or the like. In the depicted embodiment, the chainsaw 100 includes an actuator 116. The actuator 116 is disposed proximate to the handle 108. When depressed, the actuator 116 can engage the motive device to cause the chain 104 to move. As the actuator 116 is depressed further, a speed of the motive device can increase from zero speed to a maximum speed. In this regard, the actuator 116 may variably affect the speed of the motive device between a stopped speed, which occurs when the actuator 116 is not depressed, and a maximum speed, which occurs when the actuator 116 is fully depressed.

Figure 2:
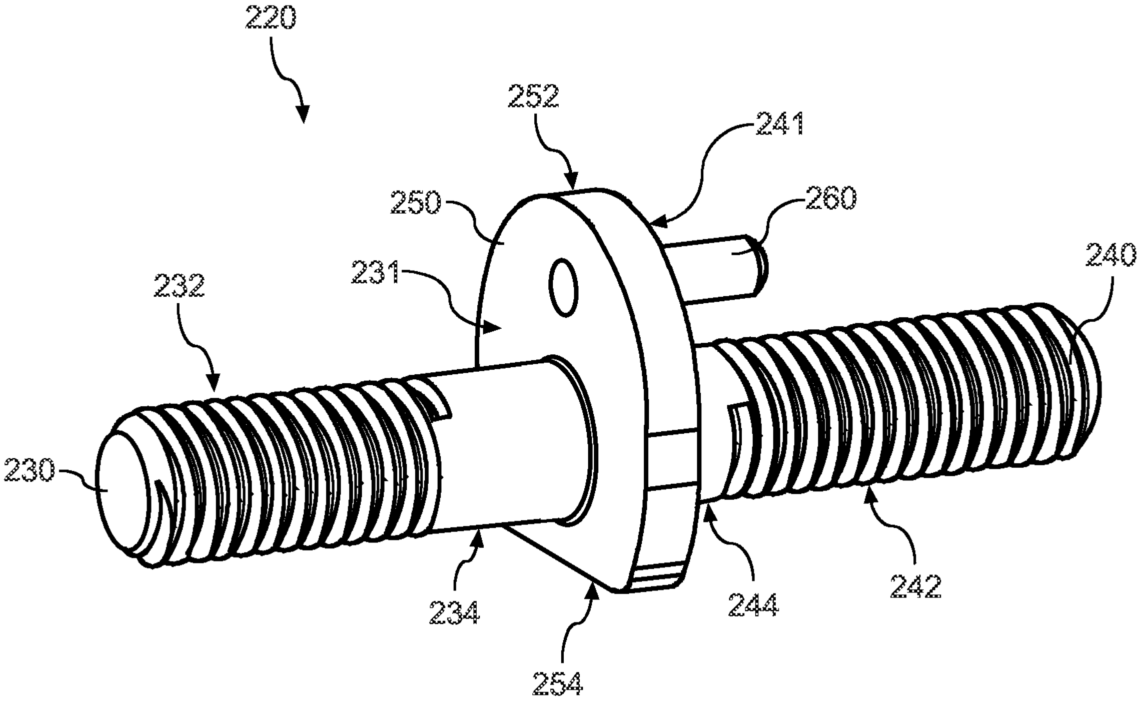
FIG. 2 provides a perspective view of an embodiment of a bar stud in accordance with aspects of the present disclosure.

Referring now to FIG. 2, a perspective view of an embodiment of a bar stud 220 is provided. Embodiments of the fastener assembly 200 at the chainsaw 100 include the bar stud 220. The bar stud 220 includes a plate 250 from which a first threaded member 230 extends from a first side 231 of the plate 250. The plate 250 includes a second side 241 from which a second threaded member 240 extends in an opposite direction from the first threaded member 230. Each threaded member 230, 240 includes a threaded end 232, 242 at a distal end from the plate 250 and a shank 234, 244 at a proximal end to the plate 250. For instance, a threaded member including threaded ends 232, 242 and an un-threaded central shank portion 234, 244 may include the plate 250 positioned at the central shank portion 234, 244.

In some embodiments, the plate 250 and members 230, 240 may be formed from a unitary, monolithic component and machined down to include threads, faces, and pins such as described herein. In still some embodiments, the plate 250 and members 230, 240 may be separate components adhered to one another. For instance, the plate 250 and members 230, 240 may be brazed, welded, or otherwise bonded to one another.

The plate 250 includes an outer perimeter forming, at least in part, a rounded face 252. For instance, the rounded face 252 may extend at least a quarter arc, or half arc, or three-quarter arc, of the outer perimeter. In various embodiments, the plate 250 includes at the outer perimeter a flat face 254.

In various embodiments, a pin 260 extends from the plate 250. In some embodiments, the pin 260 extends co-directional to the second threaded member 240.

Figure 3:
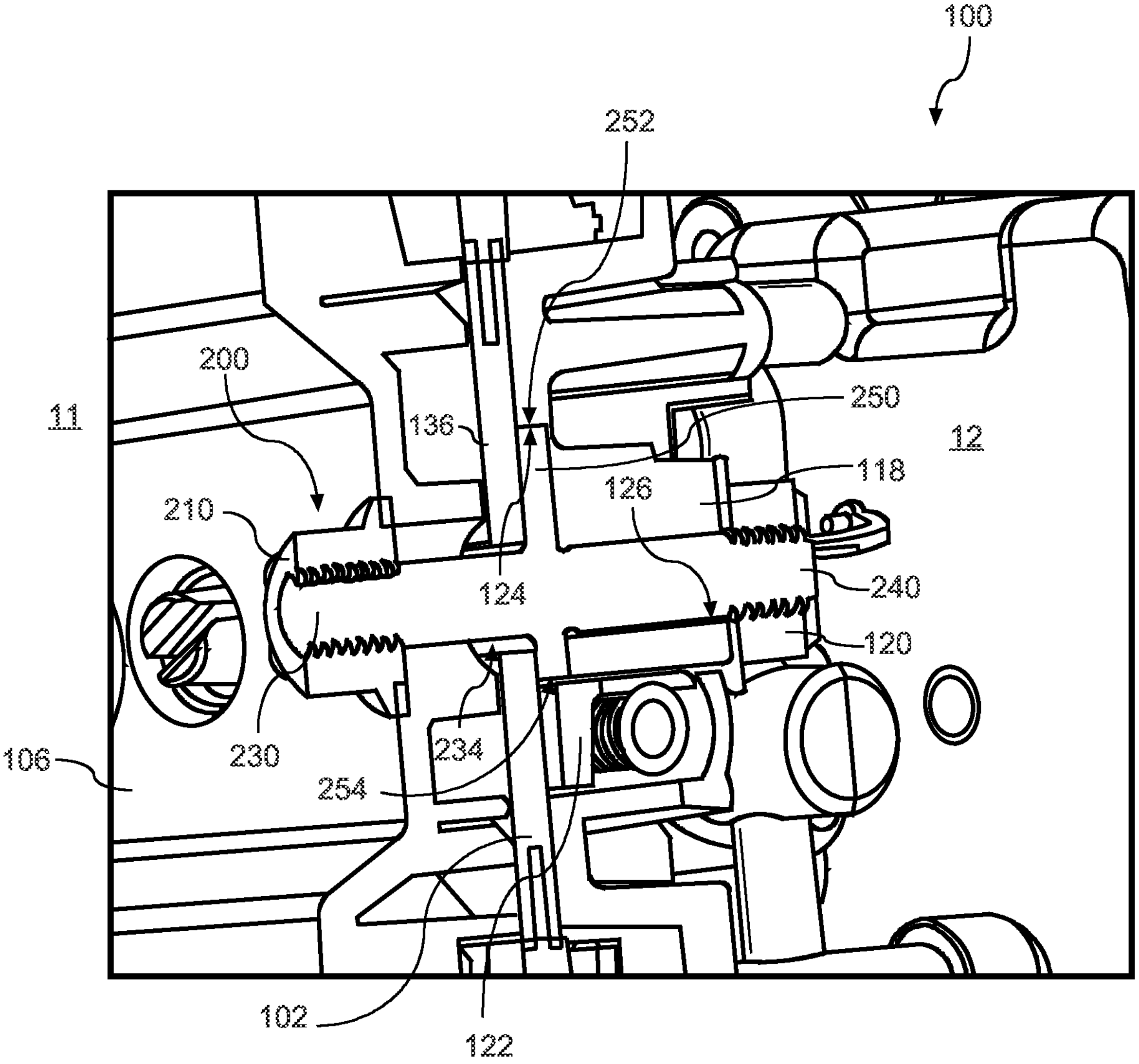
FIG. 3 provides a cutaway perspective view of an embodiment of the chainsaw including the fastener assembly in accordance with aspects of the present disclosure.

Referring now to FIG. 3, a perspective cutaway view of an exemplary portion of the chainsaw 100 including the fastener assembly 200 is provided. A reference exterior area 11 is outside of the housing 106, such as further depicted in FIG. 1. A reference interior area 12 is inside the housing 106. In various embodiments, a casing 118 is positioned within the housing 106. For instance, the casing 118 is a gear casing, such as may contain a plurality of gears, a transmission assembly, a lubrication system, fluid conduits, or combinations thereof. The casing 118 may include a metallic material generally (e.g., an aluminum material) or a non-metallic material. The guide bar 102 extends from the housing 106 and is positioned between an interior wall 136 at the housing 106 and the casing 118.

In various embodiments, the plate 250 is positioned between the guide bar 102 and the casing 118. The first threaded member 230 extends from the plate 250 through the guide bar 102 and the housing 106. An outer fastener 210 is threadable from the exterior area 11 onto the first threaded end 232 at the first threaded member 230. Accordingly, the fastener assembly 200 positions the interior wall 136 at the housing 106 and the guide bar 102 between the first side 231 of the plate 250 and the outer fastener 210.

In still various embodiments, the plate 250 is positioned between the guide bar 102 and the casing 118. The second threaded member 240 extends from the plate 250 through the casing 118. An inner fastener 120 threads from the interior area 12 onto the second threaded end 242 at the second threaded member 240. The inner fastener 120 threading onto the second threaded end 242 from the interior area 12 may allow the bar stud 220 to secure into place, such as rather than threading into the casing 118. For instance, a cylinder or cavity 126 through which the second threaded member 240 extends may form a straight-walled cavity. For instance, the cavity 126 may be substantially or completely threadless. In still various embodiments, a cylinder or cavity between the fasteners 210, 120 through which the threaded members 230, 240 extend is threadless or otherwise unattached directly to the structures through which the threaded members 230, 240 pass. Accordingly, the outer fastener 210 and inner fastener 120 may together compress the housing 106, guide bar 102, plate 250, and casing 118 together. For instance, compression of the housing 106, guide bar 102, plate 250, and casing 118 together may generate less stress, strain, or wear, or prevent overtightening at the casing 118, in contrast to pulling the components together through a threaded interface at the casing 118. Embodiments of the fastener assembly 200 may allow for different materials to be utilized at the housing 106, guide bar 102, plate 250, or casing 118, such as, but not limited to, metallic or non-metallic materials that may require less resistance to stresses or strains such as by preventing or eliminating overtightening or excessive loads such as described herein.

In some embodiments, a flange 122 is positioned adjacent to or abutting the flat face 254 at the plate 250. For instance, the flange 122 may be positioned at least partially within or at the casing 118. The flange 122 may further be positioned adjacent to the guide bar 102. The flange 122 may form a separate or separable component from the casing 118, such as an insert, washer, bushing, tooth, or member. The flat face 254 may prevent undesired rotation of the bar stud 220. For instance, the flat face 254 corresponding to the flange 122 may prevent rotation or misplacement of the flat face 254 at another location, such as, e.g., at an interior surface 124 corresponding to curvature of the rounded face 252 of the plate 250.

In still some embodiments, the pin 260 extends into the casing 118. The rounded face 252 may be positioned adjacent to or abutting the interior surface 124 of the casing 118. For instance, at least a portion of the casing 118 includes the interior surface corresponding to a curvature of the rounded face 252 of the plate 250. The pin 260 may prevent undesired rotation of the bar stud 220. For instance, the pin 260 may set a clocking location of the bar stud 220 relative to the casing 118.

Embodiments of the fastener 210, 120 may be formed of any appropriate material. In some embodiments, the inner fastener 120, the outer fastener 210, or both, may include a non-metallic fastener, such as a nylon fastener. For instance, the non-metallic fastener may provide one or more benefits such as described above, and furthermore resist corrosion and provide a lightweight retainer. Embodiments of the fastener 210, 120 may include an integral or separable washer, bushing, spacer, insert, or other surface between the outer and inner fasteners 210, 120 forming nuts.

Figure 4:
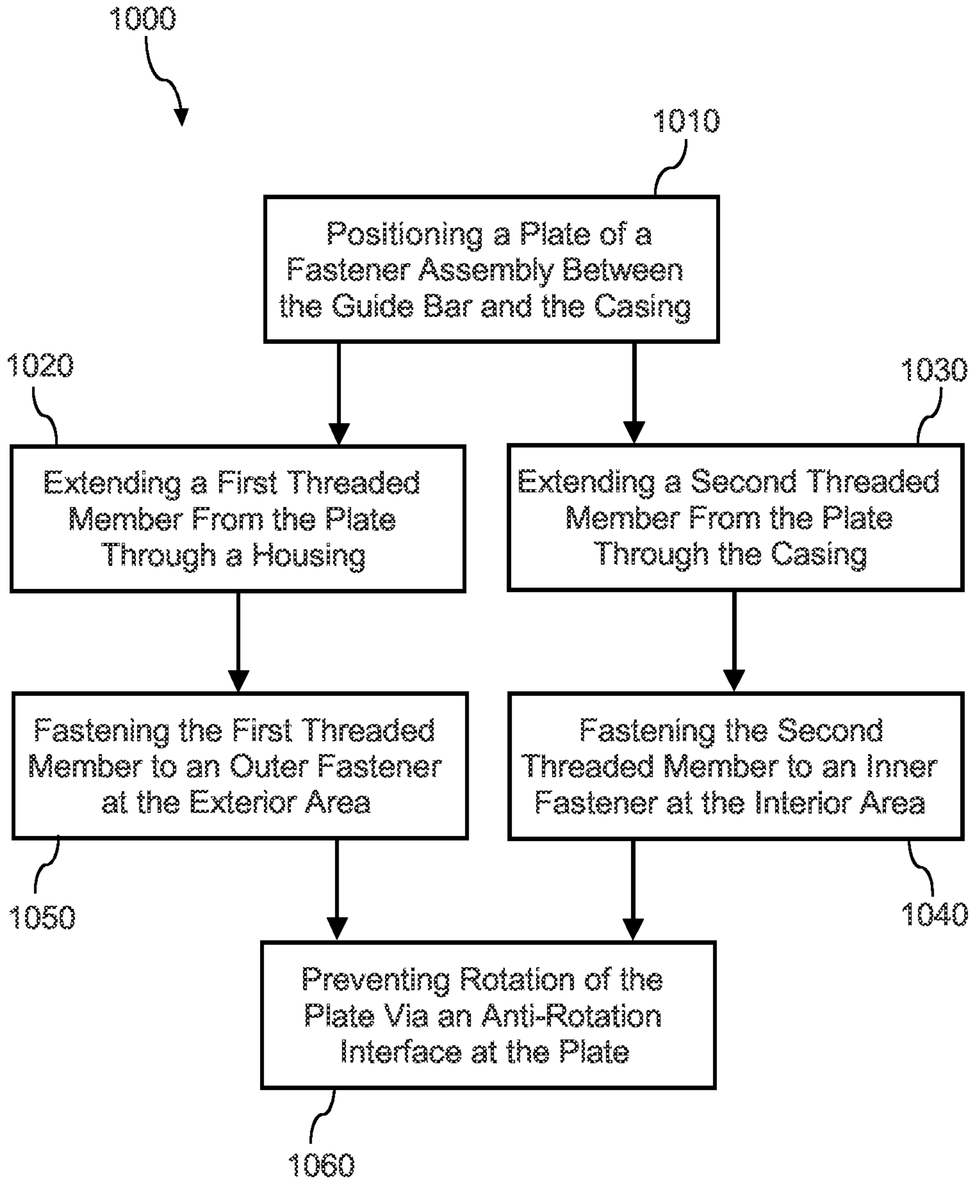
FIG. 4 provides a flowchart outlining steps of a method for attaching a guide bar to a housing and a casing at a chainsaw in accordance with aspects of the present disclosure.

Referring now to FIG. 4, a flowchart outlining steps of a method for attaching a guide bar to a housing and a casing at a chainsaw is provided (hereinafter, "method 1000"). Embodiments of the method 1000 may be performed at any appropriate type of chainsaw, such as, but not limited to, embodiments of chainsaw 100 provided herein. Embodiments of the method 1000 outlined herein may fasten a guide bar to a housing and casing at a chainsaw and mitigate generation of undesired stresses, strain, or wear at the casing, the housing, or the guide bar.

Method 1000 includes at 1010 positioning a plate (e.g., plate 250) of a fastener assembly (e.g., fastener assembly 200) between the guide bar (e.g., guide bar 102) and the casing (e.g. casing 118). Method 1000 includes at 1020 extending a first threaded member (e.g., first threaded member 230) from the plate through a housing (e.g., housing 106). A first threaded end (e.g., end 232) of the first threaded member extends to an exterior area (e.g., area 11) outside of the housing. The method 1000 includes at 1030 extending a second threaded member (e.g., second threaded member 240) from the plate through the casing. A second threaded end (e.g., end 242) of the second threaded member extends to an interior area (e.g., area 12) inside of the housing. In various embodiments, method 1000 at steps 1020, 1030 may include extending the threaded members through a threadless cavity at the guide bar, the housing, and the casing.

Method 1000 includes at 1040 fastening the second threaded member to an inner fastener (e.g., fastener 120) at the interior area. Method 1000 includes at 1050 fastening the first threaded member to an outer fastener (e.g., fastener 210) at the exterior area. In various embodiments, method 1000 at steps 1040, 1050 may include fastening the threaded members to respective fasteners and compressing the fasteners, the housing, the plate, and the casing together.

In various embodiments, method 1000 may include at 1060 preventing rotation of the plate via an anti-rotation interface (e.g., pin 260, flat face 254, or both) at the plate. In some embodiments, method 1000 at 1060 includes inserting a pin into the casing. In still some embodiments, method 1000 at 1060 includes abutting a flat face of the plate to a flange (e.g., flange 122) within the housing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A chainsaw, the chainsaw comprising:

a guide bar extending from a housing, wherein the guide bar is positioned between an interior wall of the housing and a casing interior to the housing; and a fastener assembly, the fastener assembly comprising an outer fastener, a bar stud, and an inner fastener, wherein the bar stud comprises a plate comprising a first side, a second side, and an anti-rotation interface, wherein the bar stud comprises a first threaded member extending from the first side of the plate, the bar stud comprising a second threaded member extending from the second side of the plate, wherein the plate is positioned between the guide bar and the casing, and wherein the outer fastener is threadable onto the first threaded member extending through the housing, and wherein the second threaded member is extendable through the casing and threadable onto the inner fastener.

2. The chainsaw of claim 1, wherein the second threaded member extends through a cavity at the casing, and wherein the cavity is threadless.

3. The chainsaw of claim 1, wherein the first threaded member and the second threaded member each extend through a cavity extending through the housing, the guide bar, and the casing, and wherein the cavity is threadless.

4. The chainsaw of claim 1, wherein the fastener assembly compresses the housing, the guide bar, and the casing together via the first threaded member threadably attached to the outer fastener and the second threaded member threadably attached to the inner fastener.

5. The chainsaw of claim 1, wherein the first side of the plate is adjacent to the guide bar, and wherein the second side of the plate is adjacent to the casing.

6. The chainsaw of claim 1, wherein the casing is a gear casing.

7. The chainsaw of claim 1, wherein the anti-rotation interface comprises an outer perimeter at the plate, the outer perimeter comprising a rounded face and a flat face.

8. The chainsaw of claim 1, wherein the anti-rotation interface comprises a pin extending from the plate into the casing.

9. The chainsaw of claim 8, wherein the pin extends from the second side of the plate into the casing.

10. The chainsaw of claim 1, wherein the inner fastener, the outer fastener, or both, is a non-metallic fastener.

11. A fastener assembly for a chainsaw having a guide bar extending from a housing, wherein the guide bar is positioned between an interior wall of the housing and a casing interior to the housing, the fastener assembly comprising:

an outer fastener;

an inner fastener; and a bar stud, wherein the bar stud comprises a plate comprising a first side, a second side, and an anti-rotation interface, wherein the bar stud comprises a first threaded member extending from the first side of the plate, the bar stud comprising a second threaded member extending from the second side of the plate, wherein when the plate is positioned between the guide bar and the casing, the outer fastener is threadable onto the first threaded member and extendable through the housing, and the second threaded member is extendable through the casing and threadable onto the inner fastener.

12. The fastener assembly of claim 11, wherein the second threaded member is adapted to extend through a cavity at the casing, and wherein the cavity is threadless.

13. The fastener assembly of claim 11, wherein the first threaded member and the second threaded member are adapted to extend through a cavity extending through the housing, the guide bar, and the casing, and wherein the cavity is threadless.

14. The fastener assembly of claim 11, wherein the fastener assembly is adapted to compress the housing, the guide bar, and the casing together via the first threaded member threadably attached to the outer fastener and the second threaded member threadably attached to the inner fastener.

15. The fastener assembly of claim 11, wherein the first side of the plate is adapted to be adjacent to the guide bar, and wherein the second side of the plate is adapted to be adjacent to the casing.

16. The fastener assembly of claim 11, wherein the anti-rotation interface comprises an outer perimeter at the plate, the outer perimeter comprising a rounded face and a flat face.

17. The fastener assembly of claim 11, wherein the anti-rotation interface comprises a pin extending from the plate into the casing.

18. The fastener assembly of claim 17, wherein the pin extends from the second side of the plate into the casing.

19. A method for attaching a guide bar to a housing and a casing at a chainsaw, the method comprising:

positioning a plate of a fastener assembly between the guide bar and the casing;

extending a first threaded member from the plate through a housing, wherein a first threaded end of the first threaded member extends to an exterior area outside of the housing;

extending a second threaded member from the plate through the casing, wherein a second threaded end of the second threaded member extends to an interior area inside of the housing;

fastening the second threaded member to an inner fastener at the interior area; and fastening the first threaded member to an outer fastener at the exterior area.

20. The method of claim 19, the method comprising:

preventing rotation of the plate via an anti-rotation interface at the plate.

* * * * *